United States Patent [19]

Hartlepp

[11] Patent Number: 4,813,528
[45] Date of Patent: Mar. 21, 1989

[54] CONVEYOR LOADING SYSTEM

[75] Inventor: Karl H. Hartlepp, Burlington, Canada

[73] Assignee: Dominion Chain Inc., Stratford, Canada

[21] Appl. No.: 107,561

[22] Filed: Oct. 13, 1987

[30] Foreign Application Priority Data

Feb. 6, 1987 [CA] Canada .................................. 529145

[51] Int. Cl.$^4$ ............................................. B65G 37/00
[52] U.S. Cl. .............................. 198/463.4; 198/464.3; 198/468.01; 198/475.1; 198/479.1
[58] Field of Search ............ 198/372, 456, 457, 464.3, 198/468.01, 475.1, 479.1, 723, 598, 370, 357, 358, 463.4, 448–450

[56] References Cited

U.S. PATENT DOCUMENTS

| | | | |
|---|---|---|---|
| 2,362,043 | 11/1944 | Beaulieu et al. | 198/463.4 |
| 2,769,520 | 11/1956 | Davidson et al. | 198/463.4 |
| 3,212,623 | 10/1965 | Griffith | 198/372 |
| 3,776,344 | 12/1973 | Harrison | 198/457 |
| 4,441,604 | 4/1984 | Schlig et al. | 198/372 |
| 4,645,063 | 2/1987 | Seragnoli | 198/475.1 |

*Primary Examiner*—Joseph E. Valenza
*Attorney, Agent, or Firm*—Barnes, Kisselle, Raisch, Choate, Whittemore & Hulbert

[57] ABSTRACT

There is described a loading system, for use with a conveyor transfer system, which comprises a conveyor and a pusher assembly. The conveyor is located adjacent and parallel to a portion of a conveyor transfer system and is driven to travel at the same velocity as the adjacent conveyor transfer system. The pusher assembly comprises: a pusher member located adjacent an upper surface of the conveyor; a mounting member, the pusher member being rotatably mounted on an end portion thereof; a planetary gear fixed to the mounting member and rotatably mounted on a driven mounting which is rotated around a central axis; a restrained member rotatably mounted on the driven mounting and connected through links located on common parallel chords to the pusher member; and, a driven ring gear sharing said central axis and driven in the same direction as, but at a different speed to, the driven mounting. The relative rotational speeds of the ring gear and the driven mounting, and the gear ratio between the ring and planetary gears is selected such that the mounting member is rotated in an opposite direction causing the pusher member to move across the conveyor with a parallel component of velocity equal to that of the conveyor and a normal component of velocity to push an object from the conveyor onto said adjacent system.

23 Claims, 6 Drawing Sheets

CONVEYOR LOADING SYSTEM

This invention relates to conveyor transfer systems used to move cargo from a loading point to selected locations, and more particularly to a loading system for use with such a conveyor transfer system.

A typical conveyor transfer system may comprise a plurality of package carrying pans mounted for movement along a loop track. Packages are loaded onto the pans at a loading station and may be lifted from, or tipped off, the pans at preselected locations along the track.

It is known to provide a loading system at a station located at a convenient point on a track so that packages can be placed by the loading system on pans passing the station. A conveyor belt at the station is located parallel to, and moving at the same velocity as, the pans, and a pusher bar reciprocates perpendicularly across the conveyor belt towards the pans to push packages from the belt onto vacant pans passing the station. During this operation, the bottom surface of a package on the loading system is in sliding contact with the conveyor belt and a side surface of the package slides on the pusher bar as the package moves with the belt. Friction between the package and the pusher bar can cause the packages to be slowed relative to the conveyor belt so that the packages slide on the belt also. These somewhat unpredictable movements can result in the package missing the vacant pan which it was intended to occupy.

In addition, the exterior of the package may suffer damage due to the conflicting forces acting on the bottom and side of the package.

It is an object of this invention to provide a loading system in which the pusher bar moves diagonally across the conveyor belt with a perpendicular velocity component, to push a parcel across the conveyor belt, and a parallel velocity component similar to the velocity of the conveyor belt, to follow the package as it is carried by the conveyor belt so that the movement of the package is better controlled to place the package on the pan in a preferred location on the pan.

In one of its aspects the invention provides a loading system for placing items of cargo individually on passing pans of a conveyor transfer system for subsequent delivery at selected destinations along the transfer system. The loading system includes conveyor means for positioning adjacent the transfer system to permit sliding the cargo horizontally off the conveyor means and onto the pans and first drive means operable to move the conveyor means at substantially the same speed as the pans. A pusher assembly has at least one pusher having a pusher face. Pusher suspension means is coupled to the pusher to restrain the pusher to move in a looped path which includes a substantially straight portion extending across the conveyor means and having a first component in the direction of movement of the pans and having a similar velocity. An orthogonal second component pushes the cargo off the conveyor means and onto a selected one of the pans while the cargo moves with the conveyor means and the pusher in the direction of movement of the pans, and pusher control means retains the pusher face in alignment with the direction of movement of the pans. A second drive means is coordinated with the first drive means to actuate the pusher to move the cargo.

The invention will now be described, by way of example, with reference to the accompanying drawings, in which.

Figure 1:
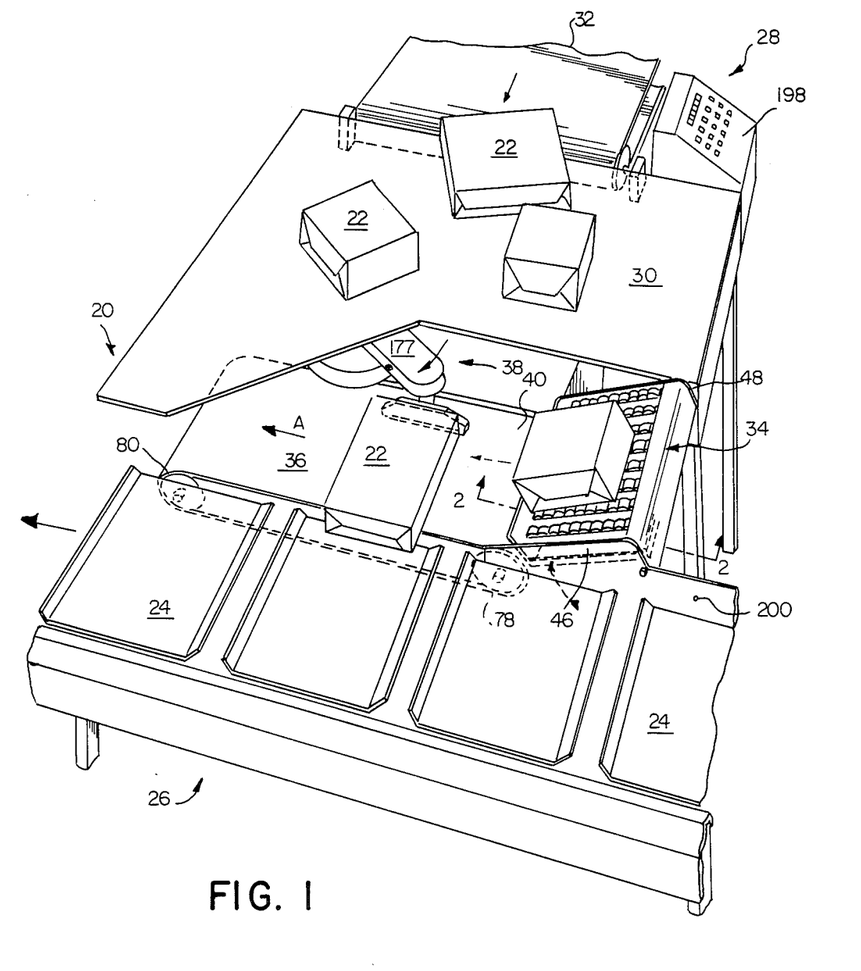
FIG. 1 is a perspective view of a loading station of an exemplary conveyor transfer system having a transfer table and including a loading system in accordance with a preferred embodiment of the present invention.

Referring to FIG. 1 of the drawings, a loading system desginated generally by the numeral 20 is used to place cargo such as parcels or packages 22 on vacant pans 24 of a conveyor transfer system 26 (shown in part) which is usually in the form of a continuous loop.

The loading system 20 forms part of a loading station 28 which is manned by an operator and includes a transfer table 30 located at the end of an incoming package conveyor belt 32. The operator, who stands or sits adjacent the right side of the table 30 (as drawn in FIG. 1), lifts packages 22 one at a time from the table 30 to a package slipway 34 which slopes downwardly towards the loading system 20. The loading system 20 includes a short conveyor belt 36 and a pusher assembly 38, and the parcel slipway 34 which leads onto the receiving end 40 of the conveyor belt 36.

Figure 2:
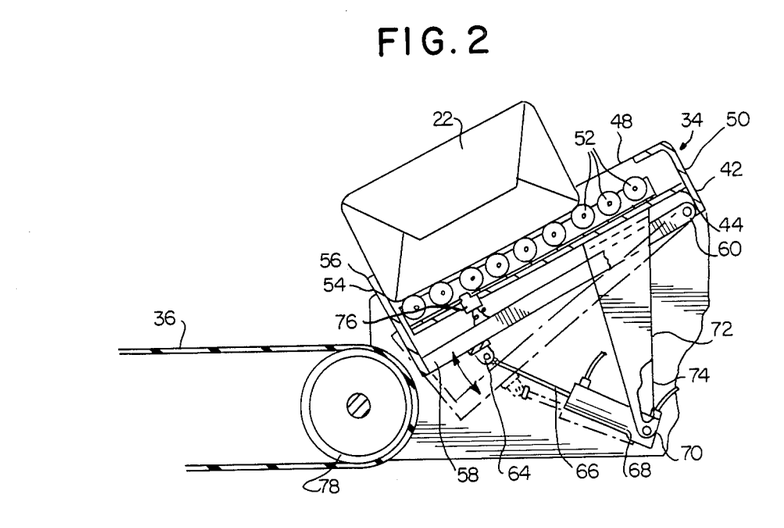
FIG. 2 is a broken away cross-sectional view on line 2—2 of FIG. 1 showing details of the parcel slipway of the loading system.

The package slipway 34, which is shown in more detail in FIG. 2 of the drawings, includes a housing 42 having a base plate 44, sides 46 and 48 and a protective end cover 50. Parallel rows of rollers 52 are mounted on the base plate 44 such that packages 22 may travel down the slipway 34. Packages 22 are retained at the bottom end of the slipway 34 by a gate 54 which includes an end plate 56 retaining package 22 on the slipway. A base member 58 is pivotally mounted on a pin 60 which extends behind and parallel to the slipway end cover 50 and is mounted in the side 46 adjacent the near edge of the transfer system 26. A further pivotal connection 64 is provided between the lower portion of the base member 58 and a rod 66 which extends from a double acting cylinder 68. This cylinder is mounted on a first pin 70 which extends between the lower ends of two cylinder support plates 72, 74. The upper ends of the plates 72, 74 are fixed to the lower surface of the parcel slipway base plate 44.

When it is desired to drop a package 22 from the slipway 34 to the conveyor belt 36, the cylinder 68 is activated to retract the gate 54 to the position shown by the ghost outlines in FIG. 2. With the gate 54 in this position, the package 22 passes from the slipway 34 onto the belt 36. When the package 22 has moved to the belt 36 the cylinder 68 is reactivated to lift the gate 54 so that the slipway 34 is then ready to again receive a package.

A reflective photocell package detector 76, the purpose of which will be explained below, is provided in the lower portion of the slipway base plate 44.

As seen in FIG. 1, the conveyor belt 36 passes around two rotatably mounted cylinders 78, 80, one of which is driven to move the top run of the belt 36 in the direction shown by arrow A (FIG. 1), at a velocity matching that of the pans 24 of the transfer system 26.

Figure 4:
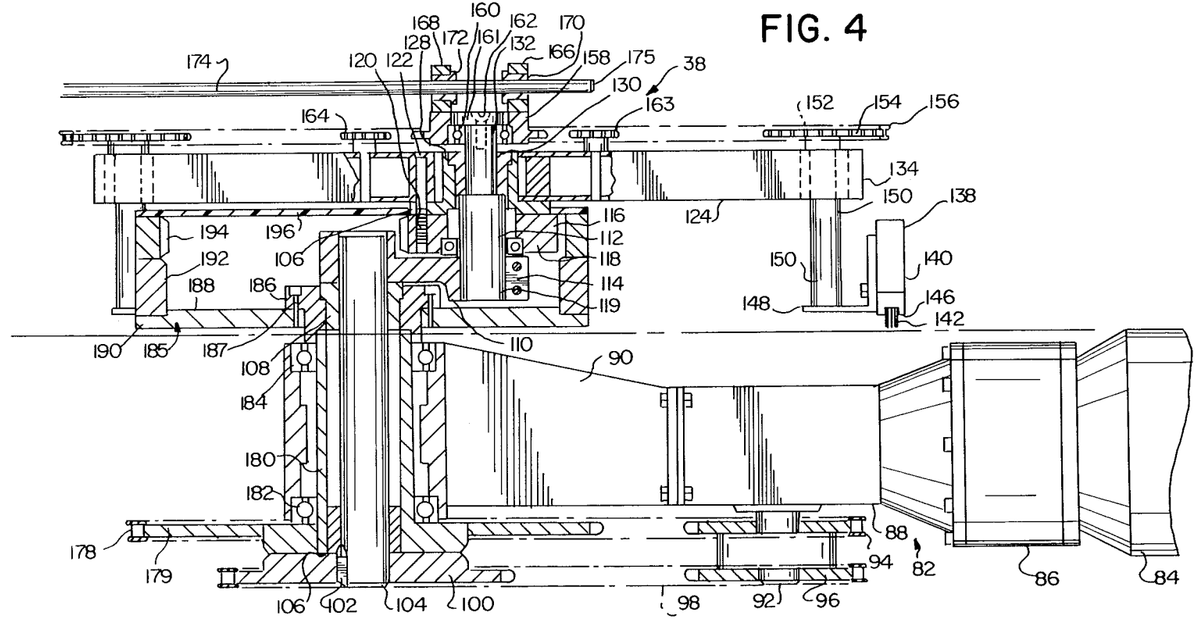
FIG. 4 is a side view taken generally on of line 4—4 of FIG. 7 of the pusher assembly and shown partially in cross section.

Reference is next made to FIG. 4 to describe details of construction of the pusher assembly 38. The operation of this assembly will be described subsequently with reference to the sequential drawings, FIGS. 5 to 7. The pusher assembly 38 is mounted on an arm 82 which lies beneath the plane of the upper surface of conveyor belt 36. The arm 82 comprises an electrical drive motor 84, a clutch and brake mechanism 86, gearbox 88 having a 20:1 reducer and right angle drive, and a mounting bracket 90.

A drive shaft 92 extends downwardly from the gearbox 88 and two parallel twenty-eight tooth sprockets 94, 96 are mounted thereon. A chain 98 passes about the lower sprocket 96 and about a further twenty-eight tooth sprocket 100 which is keyed, at 102, to a shaft 104 that passes vertically through the end portion of the mounting bracket 90. The shaft 104 is mounted in bushings 106, 108 and is fixed, at its upper end, to a downwardly stepped radial arm 110. An upwardly extending stepped spindle 112 is held in a clamp 114 at the free end of the arm 110 and a forty tooth planetary gear wheel 116 is mounted through bearings 118 on the lower portion 119 of the spindle 112. Thus, the arm 110 can be driven to rotate around the axis of the shaft 104.

The gear wheel 106 is provided with a vertical threaded aperture 120 to receive a screw 122 which fixedly attaches a swing arm 124, at its mid point, to the gear wheel 116. The screw 122 also passes through an apertured circular plate 126 which sits on the upper face of the gear wheel 116 and has a vertically extending collar 128. A bushing 130 is located within the collar 128 which surrounds the lower part of the upper portion 132 of the stepped spindle 112.

The swing arm 124 is of hollow rectangular section and has apertured end portions 134, 136 at 350 millimeter radii from the mid-point of the arm 124. On each end portion 134, 136 there is mounted a pusher 138 having a pushing face 140 oriented parallel to the direction of movement of the conveyor belt 36. The pushers are proportioned to ensure engagement with the parcels and each pusher has a brush 142 which rests either on the belt 36, or on a rear surface 144 which lies level with the upper run of the belt 36. The brush 142 extends from a slot 146 in the lower edge of the pusher 138.

Figure 3:
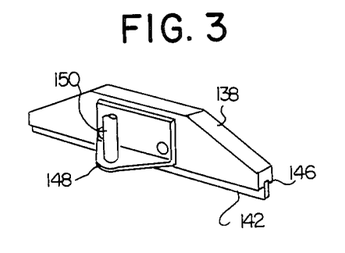
FIG. 3 is a rear perspective view of a member of a pusher assembly used in loading system of FIG. 1.

As also seen in FIG. 3, bracket 148 is fixed to the rear of each pusher 138 and has an upstanding spindle 150 for pivotal connection with the respective apertured end portion 134, 136 of the arm 124. The spindles 150 are offset sixty millimeters to the rear of the respective pushing face 140.

The upper end 152 of each spindle 150 extends from the upper face of the arm 124 and is fixed to a sprocket 154. A chain 156 which extends over the length of the arm 124 passes around and links the sprockets 154. The chain 156 also passes around a central sprocket 158, of equal diameter to that of the sprockets 154. Sprocket 158 is rotatably mounted through bearings 160 on the upper portion 132 of the spindle 112, the bearings 160 being retained in place by an end cap 161 which is secured by a screw 162 to the end of the spindle 112. Two smaller idler wheels 163, 164 are provided, one on each side of the central sprocket 158, to tension the chain 156 and give a greater angle of engagement with the sprocket 158.

Two bosses 166, 168 are fixed to the upper face of the sprocket 158 and are provided with aligned guide bushings 170, 172 to slidably receive a circular section rod 174 which lies in a direction approximately perpendicular to the direction of travel of the conveyor belt 36. The rod extends from its free end 175 above the belt 36, to a pivotal mounting 176 (FIG. 5) located to the rear of the system 20 (as drawn in FIG. 1). The rod 174 restrains the rotation of the central sprocket 158 and so ensures that the pushers 138 remain in substantially constant alignment as the swing arm 124 rotates around the spindle 112. A protective casing 177 (FIG. 1) is provided for fitting over the arm 124 though this is shown removed on FIGS. 4–7.

The upper sprocket 94 on the drive shaft 192 of the reducer and right angle drive 88 drives, through a chain 178, a seventy tooth sprocket 179 located above and aligned with the sprocket 100. The sprocket 179 is fixed to the lower end of a hollow cylindrical drive shaft 180 which surrounds the shaft 104, and is mounted, through bearings 182, 184, in the end of mounting bracket 90. The drive shaft 180 drives and supports a drum 185 which includes a stepped collar 186 which is fixed to the drive shaft 180 and fixed, by means of screws 187, to a disc 188. On the outer edge 190 of the disc 188 there is a mounting ring 192 which supports a one hundred tooth ring gear 194 for engaging the planetary gear 116. An apertured dust cover 196 is fitted to the top of the drum 185 and rests upon the upper edge of the ring gear 194. Thus, the ring gear 194 can be driven to rotate around the common asix of 180 and 104.

Figure 5:
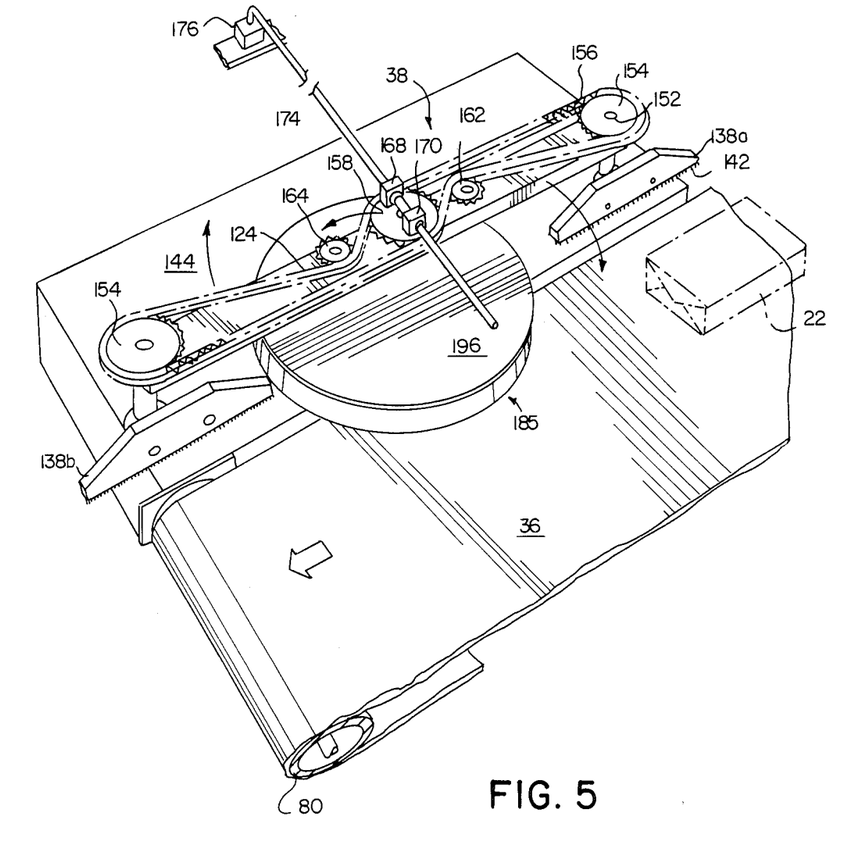
FIG. 5 is a broken away perspective view from above the loading system of FIG. 1 with the transfer table removed, at the beginning of a loading operation.
Figure 6:
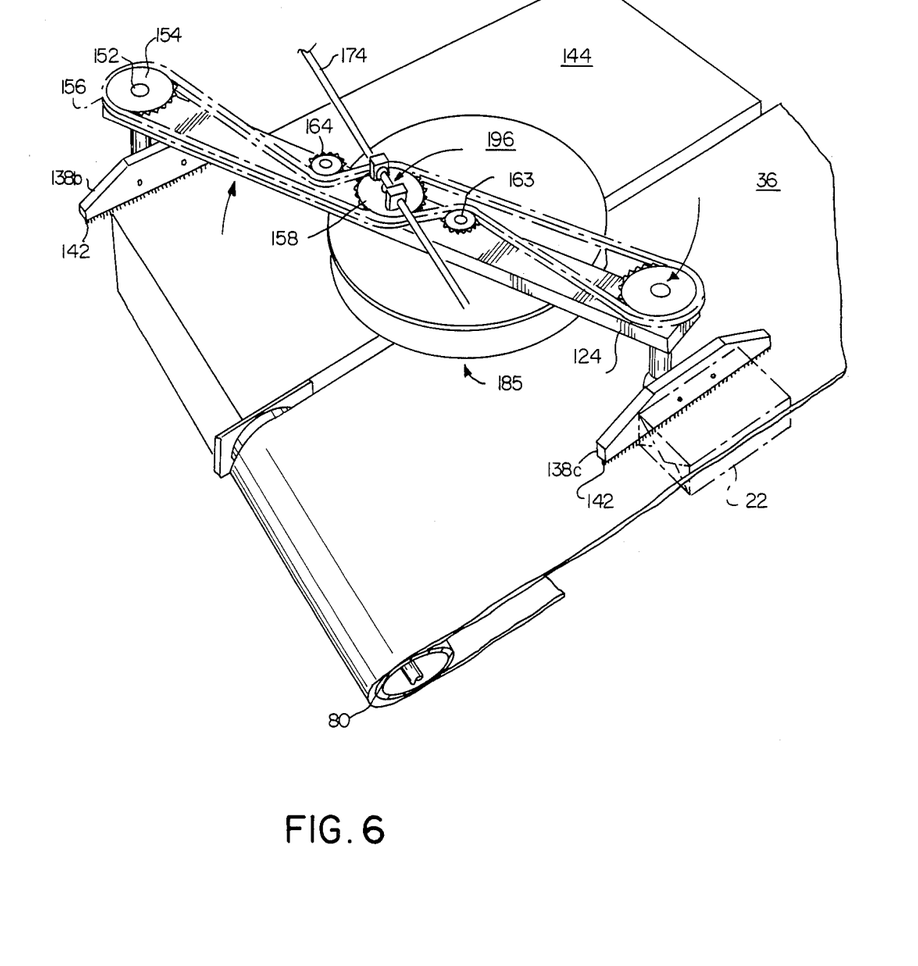
FIG. 6 is a view similar to FIG. 5 and showing the system during the loading operation.
Figure 7:
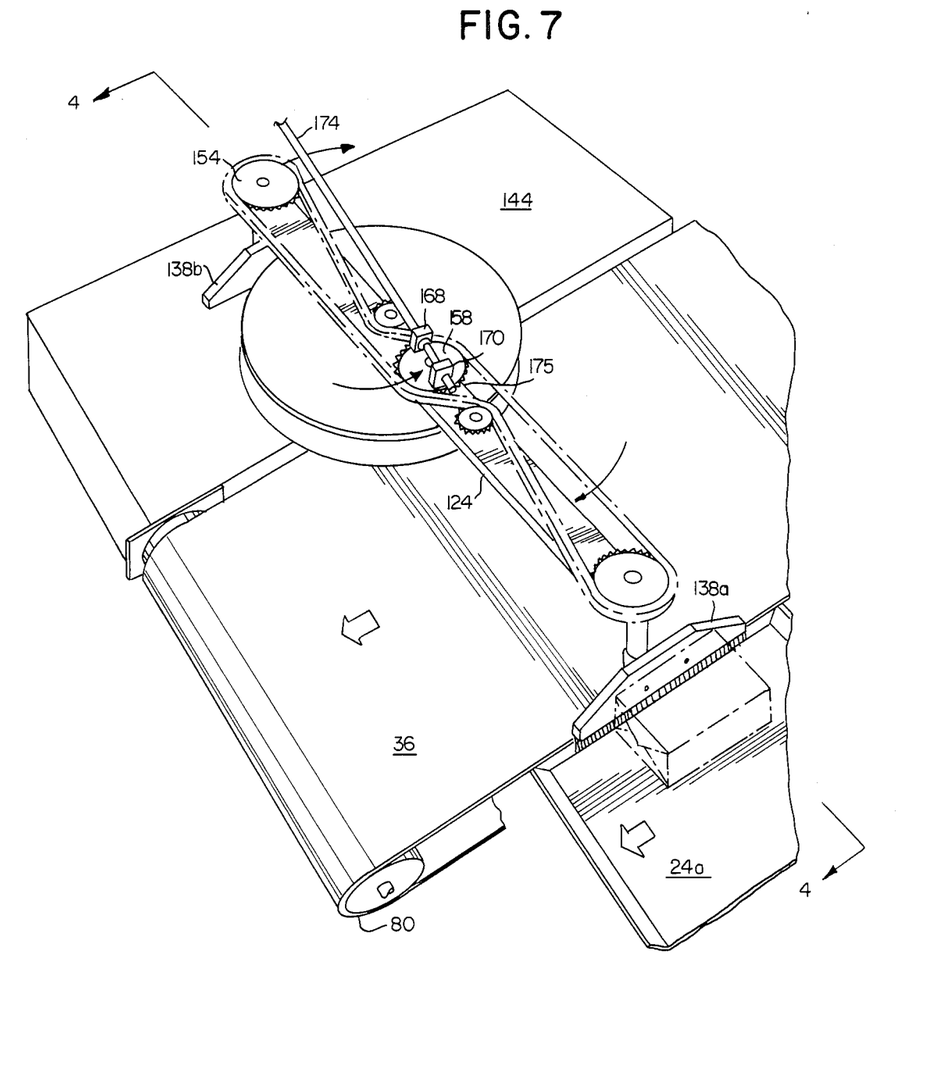
FIG. 7 is a view similar to FIGS. 5 and 6 and showing the system at the end of the loading operation.

Reference is again made to FIG. 1 and then to FIGS. 5 to 7 to describe the use of the system. The operator first selects a package 22 from the transfer table 30 and then places this on the package slipway 34 before inputting the conveyor transfer system control through a destination keyboard 198 (FIG. 1), located adjacent the transfer table 30. The destination to which the package 22 on the slipway 34 is to be sent is entered and the package is then ready to be transferred to an empty pan for transportation to the selected destination.

The photocell package detector 76 detects the presence of the parcel 22 on the slipway 34 and activates a second reflective photocell detector 200 which is located upstream of the loading station 28 for detecting an approaching pan 24 which is identified by a suitable distinguishing flag. When a pan 24 is detected, the detector 200 activates the double acting cylinder 68 to lower the gate 54 and allow the parcel 22 to roll onto the continuously moving conveyor belt 36 parallel to the moving pan 24.

The detector 200 also activates the drive motor 84 to rotate the arm 110 and the drum 185 in a counter-clockwise direction. The initial position of the pusher assembly 38 is shown in FIG. 5 with a pusher 138a adjacent the edge of the conveyor belt 36 where the package 22 from the slipway 34 has been deposited. The gearing of the pusher assembly 38 dictates that the arm 110 is rotated faster than the drum 185 such that the planetary gear 116 and the swing arm 124 rotate clockwise sweeping the pusher 138 over the conveyor belt 36. As the central sprocket 158 is coupled to rod 174, and therefore only oscillates a small degree as the arm 110 rotates, the pushers 138 are maintained in a substantially parallel orentation.

FIG. 6 shows the position of the pusher assembly 38 during a loading operation. It can be seen that the sprocket 158 on the spindle 112 (FIG. 7), has moved counter-clockwise from the initial position shown in FIG. 5 and that the arm 124 has swung clockwise, moving the pusher 138 from the surface 144 to about the side of the package 22 on the conveyor belt 36.

The drive motor speed and the gear ratios are chosen so that the resultant parallel component of the velocity of the pushers 138 is substantially the same as that of the conveyor belt 36 and pans 24. The resultant perpendicular component of the velocity of the pusher 138 is selected so that the package is loaded within the length of the conveyor belt 36 and so that as the package 22 approaches the pan 24a the package 22 has sufficient momentum to carry it to the centre of the pan 24.

The final position of the pusher assembly 38 is shown in FIG. 7 where it can be seen that the sprocket 158 and the arm 124 have been rotated further counter-clockwise and clockwise respectively. It can also be seen that the pusher 138b on the other end of the arm 124 is being swept over the surface 144 towards the initial loading operation position occupied by the pusher 138a in FIG. 5.

While the loading operation is taking place the operator can be positioning another package 22, on the slipway 34, ready for loading by the pusher 138.

Thus, the loading system 20 allows packages, or other objects, to be loaded onto a conveyor system with minimum sliding contact between the package and the pusher 138.

It will be appreciated that the parallel and perpendicular components of the velocity of each pusher 138 are resultant on the relative rotational velocities, and the relative angular positioning of the arms 110 and 124. The velocity component of the pusher 138 relative to the spindle 112, and of the spindle 112 itself, results in a velocity vector for the pusher 138 which is substantially straight and diagonal across the conveyor belt 36. It is obvious, therefore, that by altering the relative angular positioning of the arms 110 and 124 by, for example, advancing the planetary gear 116 several teeth around the ring gear 194, the resultant velocity vector of the pusher 138, and thus the angle of the vector the pusher describes as it passes over the belt 36, will be changed.

It is stressed that the transfer system described above is included by way of example and the loading system is not limited to use with the transport system described. Also, the pusher, conveyor and transport system will be operated in any suitably coordinated manner consistent with the pans moving at substantially the same velocity as the top run of the conveyor and the component of velocity of the pusher in the direction of movement of the pans. Similar relationships exist, as is common in the art, for unloading the cargo at the selected locations.

The embodiments of the invention in which an exclusive property or privilege is claimed are defined as follows:

1. A loading system for placing items of cargo individually on a passing conveyor transfer system for subsequent delivery at selected destinations along the transfer system, the loading system comprising:
   conveyor means for positioning adjacent the transfer system to permit sliding the cargo off the conveyor means and onto the transfer system,
   first drive means operable to move the conveyor means at substantially the same speed as the transfer system; and
   a pusher assembly having at least one pusher having a pusher face,
   pusher suspension means coupled to the pusher to restrain the pusher to move in a looped path which includes a substantially straight portion, extending across the conveyor means and having a first component in the direction of movement of the transfer system and having a similar velocity, and an orthogonal second component to push the cargo off the conveyor means and onto the transfer system while the cargo moves with the conveyor means and the pusher in the direction of movement of the transfer system, pusher control means for retaining the pusher face in alignment with the direction of movement of the transfer system, a second drive means coordinated with the first drive means to actuate the pusher to move the cargo,
   said pusher assembly includiing a mounting member, the pusher member being rotatably mounted on an end portion thereof, a planetary gear fixed to the mounting member and rotatably mounted on a driven mounting which is rotated around a vertical central axis; a member rotatably mounted on the driven mounting, restricted from substantial rotation, and connected through pivotal links between common parallel chords to the pusher member, and a driven ring gear sharing said central axis and driven in the same direction as the driven mounting, the relative rotational speeds of the ring gear and the driven mounting and the gear ratio between the ring gear and planetary gear being selected such that the planetary gear and mounting member are rotated in an opposite direction to cause the pusher member to move across the conveyor means.

2. A loading system as claimed in claim 1 in which the pusher assembly includes two pushers arranged to move cargo alternately.

3. A loading system as claimed in claim 2 in which the pushers are mounted for pivotal movement about respective vertical axes such that the pusher faces of the two pushers remain substantially parallel.

4. A loading system as claimed in claim 1 in which the pusher moves the cargo with sufficient velocity to propel the cargo for movement on the transfer system after contact ends with said pusher face.

5. A loading system as claimed in claim 1, wherein the pusher assembly is mounted on a support arm, the support arm including a drive means linked through two concentric drive shafts, mounted in an end portion of the support arm and on the central axis, to the driven mounting and the driven ring gear respectively.

6. A loading system as claimed in claim 1, wherein a spindle extends upwardly from the pusher member, the spindle being journalled for rotation in the said portion of the mounting member.

7. A loading system as claimed in claim 6, wherein a gear wheel is mounted on the upper end of the spindle, and the restricted member rotatably mounted on the driven member is in the form of an equivalent gear wheel, a chain extending between and around the gear wheels.

8. A loading system as claimed in claim 1, wherein the member rotatably mounted on the driven mounting is restricted in rotation by means of its sliding engagement with a remotely and pivotally mounted elongate member, the restricted member defining means for slidably receiving the elongate member.

9. A loading system as claimed in claim 1, wherein the pusher assembly is provided with two pusher members, each one mounted on an end portion of the mounting member.

10. A loading system as claimed in claim 1, and further comprising a loading slipway located adjacent the cargo receiving portion of the conveyor means, the loading slipway comprising a downwardly sloping upper surface down which cargo may travel, and a retaining member at the lower end of the surface, the retaining member being movable between a retaining position in which the upper portion of the member extends above the lower end of the sloping upper surface to retain cargo supported thereon, and a withdrawn position in which the upper edge of the member lies below the plane of the sloping upper surface to permit the cargo to drop onto the conveyor means.

11. A loading system as claimed in claim 10, wherein the loading slipway is provided with a double-acting piston and cylinder arrangement for withdrawing and repositioning the retaining member, a rod extending from the piston being pivotally connected to the retaining member.

12. A loading system as claimed in claim 9, provided with a cargo support surface located adjacent the loading slipway.

13. A conveyor transfer system for receiving items of cargo centrally and transporting the cargo individually to selected destinations, the transfer system comprising:
 a track passing the selected destinations;
 a plurality of cars guided by the track and including pans for receiving and carrying the cargo;
 first drive means operable to drive the cars at substantially constant speeds; and
 a loading station positioned adjacent the track for placing cargo on the pans as the cars travel past the loading station, the loading station including conveyor means adjacent the track to permit sliding the cargo off the conveyor means and onto the pans, second drive means operable to move the conveyor means at substantially the same speed as the pans, a pusher assembly having at least one pusher having a pusher face, pusher suspension means coupled to the pusher to restrain the pusher to move in a looped path which includes a substantially straight portion extending diagonally across the conveyor means and having a first component in the direction of movement of the pans and having a similar velocity, and an orthogonal second component to push the cargo off the conveyor means and onto a selected one of the pans while the cargo moves with the conveyor means the pusher in the direction of movement of the transfer system, pusher control means for retaining the pusher face in alignment with the direction of movement of the pans, a third drive means coordinated with the first drive means to actuate the pusher to move the cargo,
 said pusher assembly including a mounting member, the pusher member being rotatably mounted on an end portion thereof; a planetary gear fixed to the mounting member and rotatably mounted on a driven mounting which is rotated around a vertical central axis; a member rotatably mounted on the driven mounting, restricted from substantial rotation and connected through pivotal links between common parallel chords to the pusher member; and a driven ring gear sharing said central axis and driven in the same direction as the driven mounting, the relative rotational speeds of the ring gear and the driven mounting and the gear ratio between the ring gear and planetary gear being selected such that the planetary gear and mounting member are rotated in an opposite direction to cause the pusher member to move across the conveyor means.

14. A conveyor transfer system as claimed in claim 13, wherein the conveyor means is in the form of a conveyor belt.

15. A conveyor transfer system as claimed in claim 13, wherein the pusher assembly is mounted on a support arm, the support arm including a drive means linked through two concentric drive shafts, mounted in an end portion of the support arm and on the central axis, to the driven mounting and the driven ring gear respectively.

16. A conveyor transfer system as claimed in claim 13, wherein a spindle extends upwardly from the pusher member, the spindle being journalled for rotation in the end portion of the mounting member.

17. A conveyor transfer system as claimed in claim 16, wherein a gear wheel is mounted on the upper end of the spindle and the restricted member rotatably mounted on the driven member is in the form of an equivalent gear wheel, a flexible link extending between and around the gear wheels.

18. A conveyor transfer system as claimed in claim 13, wherein the member rotatably mounted on the driven mounting is restricted in rotation by means of its sliding engagement with a remotely pivotally mounted elongate member, the restricted member defining means for slidably receiving the elongate member.

19. A conveyor transfer system as claimed in claim 13, wherein the pusher assembly is provided with two pusher members, each mounted on an end portion of the mounting member.

20. A conveyor transfer system as claimed in claim 13, provided with a loading slipway located adjacent the cargo receiving portion of the conveyor, the loading slipway comprising a downwardly sloping upper surface down which cargo may travel, and a retaining member at the lower end of the surface, the retaining member being movable between a retaining position in which the upper portion of the member extends above the lower end of the sloping upper surface to retain cargo supported thereon, and a withdrawn position in which the upper edge of the member lies below the plane of the sloping upper surface to permit the cargo to drop onto the conveyor means.

21. A conveyor transfer system as claimed in claim 20, wherein a sensor is provided on the loading slipway for detecting the presence of an object, a further sensor being provided on a side portion of the conveyor transfer system for detecting an available space on the adjacent conveyor transfer system upstream of the conveyor transfer system, both sensors being linked to a control system such that when an object is on the slipway and a vacant space is approaching the conveyor transfer system, means is activated to withdraw the retaining member.

22. A conveyor transfer system as claimed in claim 20, wherein the loading slipway is provided with a double-acting piston and cylinder, a rod extending from the piston being pivotally connected to the retaining member for causing movement thereof.

23. A conveyor transfer system as claimed in claim 20, provided with a support surface located adjacent the loading slipway.

* * * * *